July 22, 1952 E. M. S. McWHIRTER ET AL 2,604,530

SPACE RESERVATION

Filed June 14, 1950 5 Sheets-Sheet 1

INVENTORS
ERIC M. S. McWHIRTER
FREDERICK W. WARDEN
BY Percy P. Lantzy
ATTORNEY

INVENTORS
ERIC M. S. McWHIRTER
FREDERICK W. WARDEN
BY Percy P. Lantzy
ATTORNEY

July 22, 1952 E. M. S. McWHIRTER ET AL 2,604,530

SPACE RESERVATION

Filed June 14, 1950 5 Sheets-Sheet 3

INVENTORS
ERIC M. S. McWHIRTER
FREDERICK W. WARDEN
BY
[signature]
ATTORNEY

INVENTORS
ERIC M. S. McWHIRTER
FREDERICK W. WARDEN
BY Percy P. Lantz
ATTORNEY

SPACE RESERVATION

Filed June 14, 1950 5 Sheets-Sheet 5

INVENTORS
ERIC M. S. McWHIRTER
FREDERICK W. WARDEN
BY Percy P. Lantzy
ATTORNEY

Patented July 22, 1952 2,604,530

UNITED STATES PATENT OFFICE 2,604,530

SPACE RESERVATION SYSTEM

Eric Malcolm Swift McWhirter and Frederick W. Warden, Mount Vernon, N. Y., assignors to International Standard Electric Corporation, New York, N. Y., a corporation of Delaware Application June 14, 1950, Serial No. 168,124

7 Claims. (Cl. 177—353)

This invention relates to automatic switching systems whereby space reservations or similar data allotted to any one of a number of future days can be automatically confirmed to a calling station.

A principal object of the invention is to provide an improved switching system for automatically selecting one of a large number of files containing reservational information or the like pertaining to respective future dates, so that such information for a particular date can be conveyed to a calling station and the reservation confirmed.

Another object is to provide a system for automatically confirming reservational data pertaining to any desired future date within a predetermined period, employing a series of telegraph message sending and receiving units of the message storage type, in conjunction with a series of automatic hunting switches and special telegraph signal coding and registering equipment, whereby a particular reservational information file can be automatically selected to enable an operator to confirm the allotment of a desired reservation to a calling station.

Another object relates to a system which is particularly well suited to the confirmation at any time, of reservational information such as accommodations, space availability or the like, concerning railroad trains, aeroplanes or other carriers.

Another object is to provide an automatic space reservation and confirmation system for carriers such as trains, aeroplanes or the like, employing a novel combination of switches and registers for translating information such as calendar data into coded pulses, which in turn control the automatic selection of a particular one of a large number of files of information which are required to be kept currently up-to-date.

A feature of the invention relates to an automatic switching system controlled by coded pulses representing the week and day within a predetermined period, for which reservational information and allotment are to be confirmed such as train space availability and the like, and employing a series of telegraph message switching units and a special electronic translator both of which are simultaneously operated in accordance with a telegraphed four-digit code, to select automatically one of a number of operator's positions. Each position comprises a large number of separate information files pertaining to a corresponding destination and the setting of said translator causes a particular file to be selected containing the information for a particular date represented by said coded pulses.

Another feature relates to a system having at a central point, a series of file stacks or groups, each stack having a series of individual information files pertaining to a particular destination; in conjunction with automatic switches and decoding mechanisms for translating a transmitted telegraph message which includes a four-digit switching control code, to automatically select the proper file stack and also the particular file in the selected stack containing information which pertains to the destination for which reservational data and the like is to be allotted and confirmed to a calling station or other point from which the said telegraph message is transmitted.

A further feature relates to a system for allotting and confirming reservations and the like, comprising a series of file stacks with each stack having a series of individual information files each containing daily information pertaining to a particular destination. The system also comprises a series of hunting switches and decoding mechanisms for translating a transmitted telegraph message including a four-digit switching control code, to automatically select a particular file in the selected stack which file contains the availability space or accommodations for the desired date. The total number of daily files corresponds to a predetermined period of time during which future reservations are to be made, for example eight weeks. Since the switching code is a function of the number of weeks running between the current week and the week containing the date for which a reservation is to be obtained, and since the individual files are spaced by fixed distances in the stack, it is necessary to provide what is termed a calendar adjuster so that the proper file is selected regardless of the week during which the reservation is being confirmed and this provides one important feature of the present invention.

A still further feature relates to the novel organization, arrangement and relative location and interconnection of parts which cooperate to provide an improved space or accommodation allotment control for railroad systems, airline systems or any other system where items are to be reserved for any future date.

Other features and advantages not particularly enumerated will be apparent after a consideration of the following detailed descriptions and the appended claims.

In the drawings:

Figs. 1 and 2, taken together, show a schematic block and wiring diagram of a system according to the invention.

Figure 1:
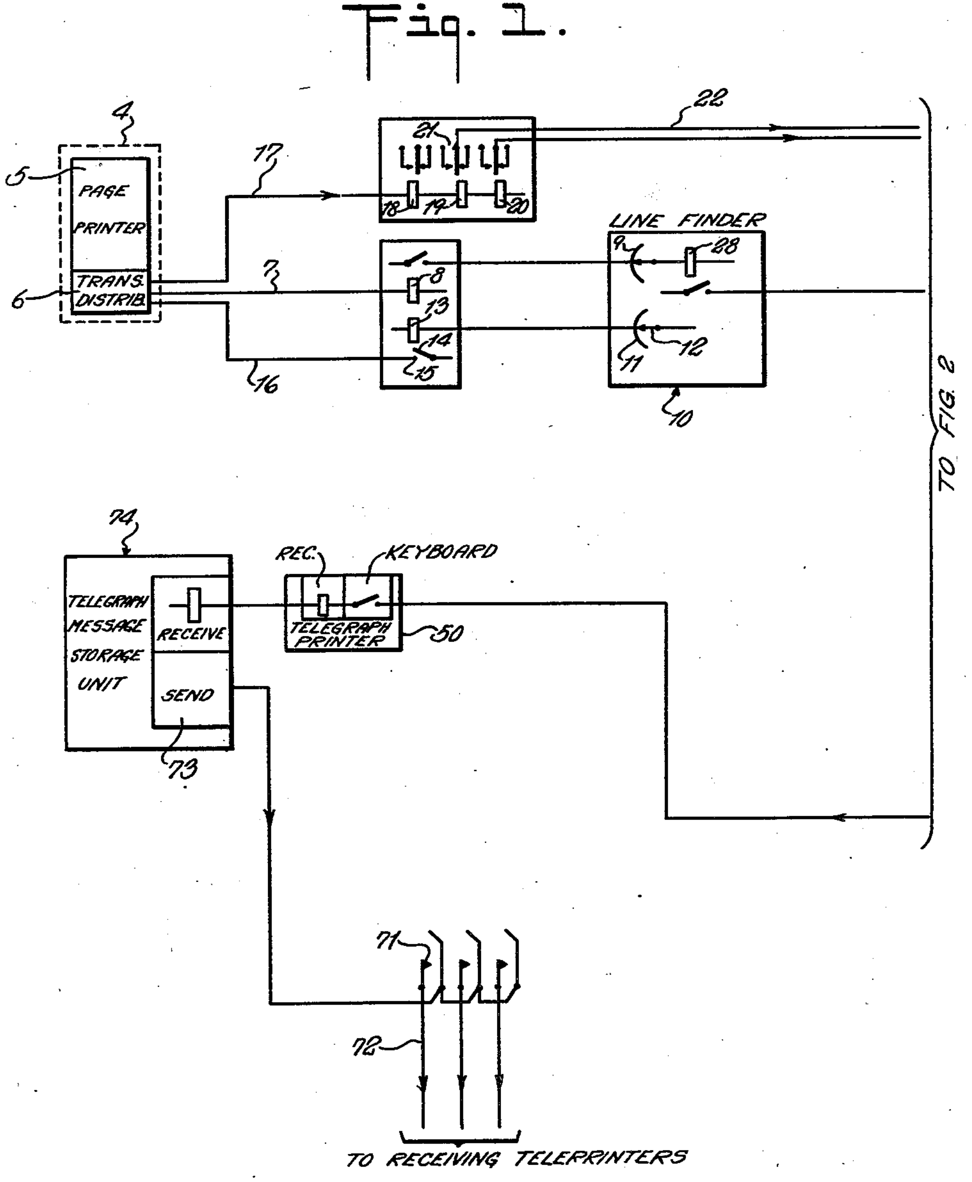

The invention finds its greatest and immediate utility in disseminating information as to train schedules, for example information concerning the space or accommodations availability and the like, on trains or other vehicles which have scheduled runs between a central point and various destinations. For example, in making reservations for space accommodations on trains or other vehicles, it has been the practise heretofore to employ one or more announcing attendants at a central point who can be reached by ordinary telephone connection from any one of a large number of ticket selling or space reservation offices. During very heavy traffic seasons, considerable delay and inconvenience are encountered before the announcing attendant at the central point can be reached by any particular reservation clerk. In fact, the obtaining of the desired information as to available space is, to a great degree, a function of the personal element and assiduity of the reservation clerk in making repeated calls to the announcing attendant until a conversational connection is finally established. Furthermore, even after the connection has been established, much time is consumed in conveying the requested reservation data to the announcing attendant, and also by the announcing attendant having to consult a great number of records to determine what space or accommodations are available on any desired date, which may vary from one day to as many as seventy days or ten weeks from the date on which the reservation information call is being placed.

Furthermore, even after the desired reservation information has been obtained by the reservation clerk, it is necessary to have the available space reservation confirmed, and also to enable the information clerk at the central information point to revise the records, so that the same space accommodations are not erroneously re-assigned. There is disclosed in co-pending application of McWhirter-Popp for "Intelligence Exchange Systems," Serial No. 177,534, filed simultaneously herewith, a system for enabling a reservation clerk to obtain automatically, merely by dialing a four-digit code, the space availability for any desired future date. The code that is used according to said prior application, is also used in practising the present invention. To enable the calling reservation clerk to select automatically the particular one of a large number of information files located at respective information operators' positions, while simultaneously supplying the particular operator with a complete printed telegraph message containing the following information: four numerical digits representing in code form the destination, the week and day for which the reservation is desired; the actual calendar date on which the reservation is being allotted and confirmed; the type of space or accommodation desired, for example roomette, berth, drawing room, etc.; starting and destination points, e. g. New York and Chicago; and a symbol identifying the transaction and calling reservation clerk's station. When the proper operator's position at the central information bureau is automatically selected, the complete message appears before the operator at that position in the form of a telegraph printing and also in the form of a perforated tape. At the same time that this record appears before the said operator, the proper file at that particular operator's position is automatically selected and ejected in front of the operator, so that the allotted space information can be deleted from that particular file. The operator then revises the message on the perforated tape to add thereto a symbol identifying the particular space which has been allotted, as well as the number of the car carrying that space. This revised telegraph perforated tape is then used to control a transmitter for transmitting the complete confirmation message back to the calling reservation clerk for entry on an appropriate ticket for sale. Because of the fact that the message is transmitted to the operators' positions at the central information bureau by telegraphic methods, it is necessary to employ a special form of receiving translator and register to translate the telegraphic message into the selective electrical marking of one of a number of circuits each identified with a particular operator's position and also to selectively and electrically mark one of a series of eight week-identifying circuits, and also one of seven day-identifying circuits. As a result of the conjoint marking of these circuits, automatic file-selecting mechanism is set so as to select the particular operator's position assigned to the desired destination, and also to automatically select and eject the particular file containing all the space availability data for the various trains running to the desired destination on the particular reservation date in question. Since these files are normally fixedly spaced on a suitable carrier or conveyor so as to bring them successively into registry with the file ejection mechanism, and since the week code number identifying the week containing the reservation date will vary depending upon the week during which the calling is taking place, it is necessary to provide what is referred to herein as a "calendar-adjuster," so that the proper file is automatically ejected even though the weekly digit of the code identifying that file, varies from week to week, as will be explained hereinbelow.

Figure 5:
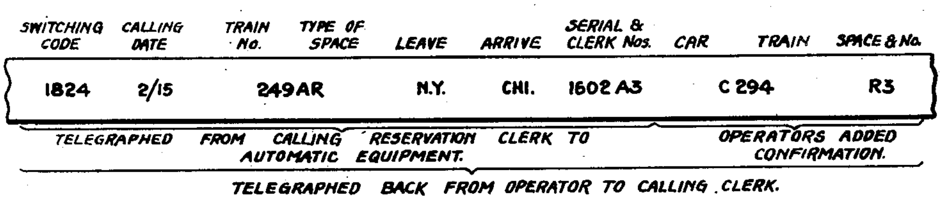
Fig. 5 represents a portion of a telegraph message tape containing a control message according to the invention.

Let it be assumed by way of example that a calling reservation clerk whose identifying symbol is A3 is desirous of confirming a roomette on train 294 from New York to Chicago for February 23rd, assuming that the calling date is February 15th, 1949. It will be assumed, merely for purposes of explanation, that the Chicago destination is represented by the destination code digits 1–8. Since the calling date is assumed to be February 15th, the current week will then begin on February 13th. Therefore the two digits representing the reservation date would be 2–4, as will be explained hereinbelow. Therefore the calling reservation clerk will transmit by conventional teleprinter mechanism a message, a typical one of which is illustrated in Fig. 5 of the drawing. The first part of the message, consisting of the four digits 1–8–2–4, is used to control the setting of an electronic receiver or translator for translating the telegraphed four-digit code into register relay settings. It will be assumed that the system is designed to accommodate twenty different destinations. Consequently, for each selective setting of the said relays, a particular one of twenty conductors will be electrically marked so as to control the selective connection of a re-transmitter which contains the stored message, enabling the complete transmitted message to be printed at the selected operator's position. The third digit of the four-digit code causes the electrical marking of one of the eight week control circuits, it being assumed that the system is designed to cover reservational information for a full eight-week period. The particular weekly circuit that is marked, will therefore depend upon the number of weeks, counting from the current week (that is the week in which the call is being placed), and the week containing the desired reservation date which will be referred to herein as the "reservation week."

Figure 3:
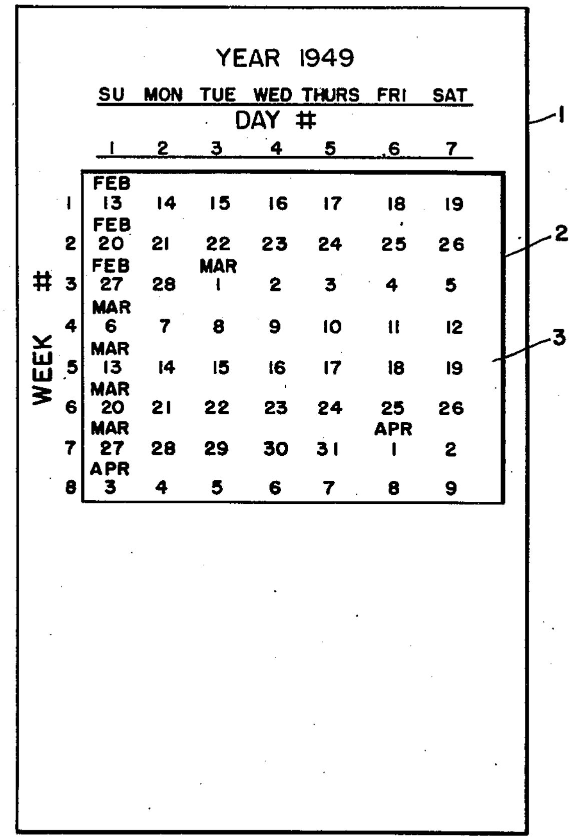
Fig. 3 is a face view of a coding calendar used in practising the invention.

In order that the calling reservation clerk can determine the appropriate third and fourth digits for the switching control section of the message, it is necessary that he have some kind of basic daily reference. The third digit of the code represents the reservation week thus the current week will be represented by the digit 1, the next following week by the digit 2, and so on until the last week is represented by the digit 8. Likewise, the fourth or daily digit represents Sunday by digit 1, the digit 2 represents Monday, and so on until Saturday is represented by the digit 7. Fig. 3 shows a form of shiftable calendar which may be provided for each reservation clerk so that he can expeditiously determine the third and fourth digits. This calendar may comprise a cardboard or similar member 1 having a window 2 past which is slidable a weekly calendar sheet 3. In the case of an eight-week reservation period, the window will have a length so as to accommodate for any desired setting of sheet 3 an eight-week calendar sequence. The margin of window 2 adjacent the left-hand edge, bears eight digital markings 1 to 8; and the upper margin of the window, bears seven digital markings 1 to 7 representing respectively the eight week reservation period and the seven days of the week. Throughout this description it will be assumed that the "current week" begins on Sunday, February 13th, so that the sheet 3 is positioned to bring the date February 13th into horizontal alignment with the left-hand digit number 1. Assuming that the reservation date is February 13th, then the third and fourth digits of the code would be 1–1; likewise the third and fourth digits for a reservation date of February 19th would be 1–7; and likewise the code digit for March 2nd would be 3–4.

Figure 2:
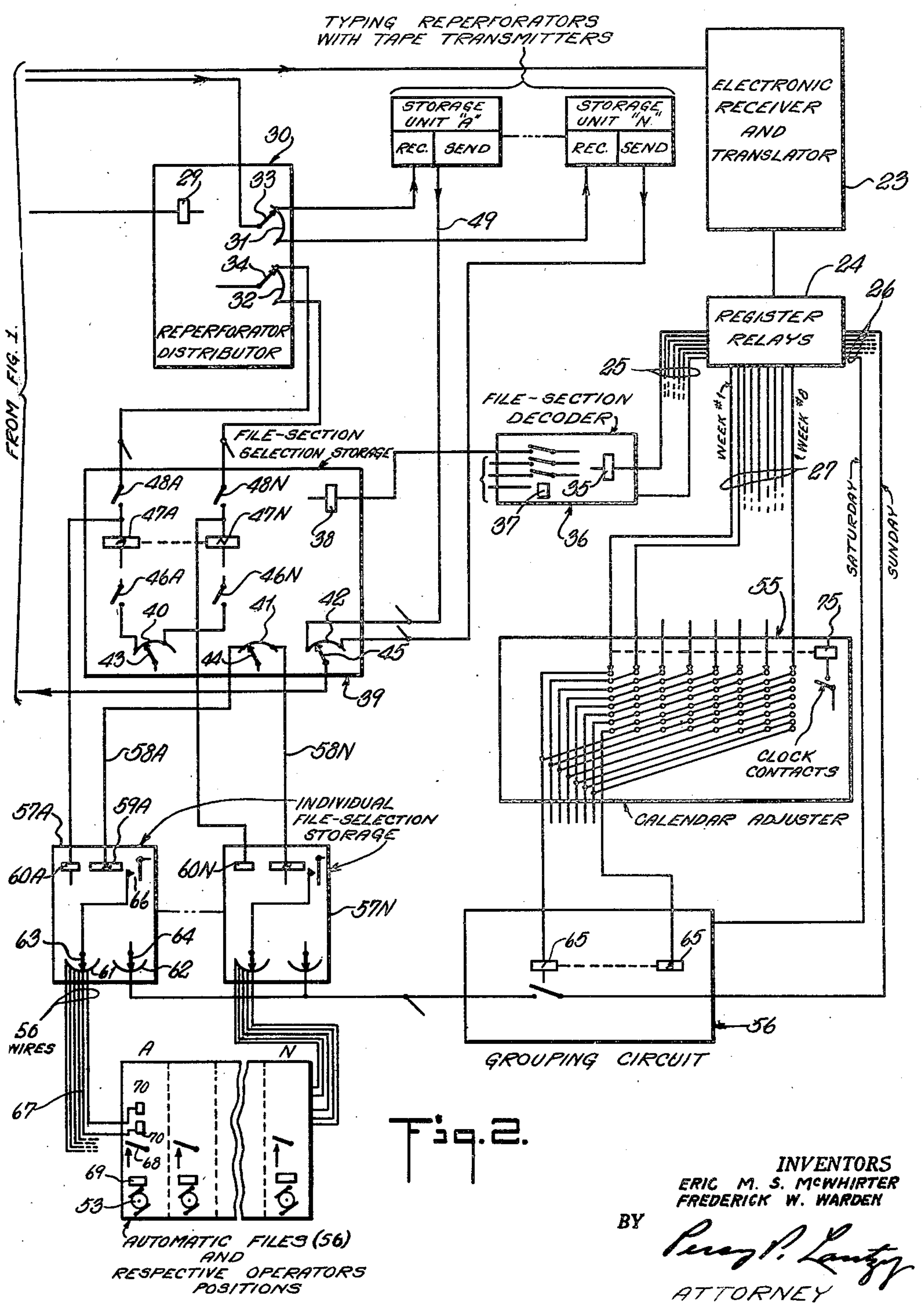

Let it be assumed, in Figs. 1 and 2, that the calling date is February 15th of the current week beginning February 13th, and the reservation date is February 23rd. Let it also be assumed that the destination is Chicago (code 1–8). Then the calling reservation clerk, upon consulting the calendar of Fig. 3, will see that the first part of the telegraph message will be 1–8–2–4. In Fig. 1 there is represented by the dotted rectangle 4, one of a series of calling reservation clerk's stations. Each such station includes a standard telegraph page printer 5 with its conventional keyboard and with the conventional transmitting distributor 6. By means of a suitable key at the calling station, when the reservation clerk wishes to make and confirm a reservation, he applies in any suitable way ground over the call line 7 to operate the line relay 8. The operation of relay 8 applies hunting potential to the corresponding contact in contact bank 9 of the line finder switch 10, and causes this switch to hunt, in the well-known manner, for this particular marked contact. The line finder switch has a second contact bank 11 and an associated rotary brush 12. When the calling line is thus found, brush 12 completes a circuit to operate relay 13 in the line circuit. This relay at its contacts 14, 15, closes a circuit over conductor 16 to the usual start control mechanism of the transmitting distributor 6. It will be understood, of course, that prior to placing the call, the reservation clerk has recorded on the page printer 5 and on a suitable perforated tape, the message identifying the desired reservation. Consequently, when relay 13 operates, it causes the transmitting distributor 6 to send out teleprinter pulses over the signalling line 17. This results in the operation of the telegraph transmitting relays 18, 19 and 20. Relay 19 at its contacts 21, applies mark and space signal potentials to line 22 which leads to the electronic receiver and translator 23. This translator is connected to a set of register relays represented by block 24. For a detailed description of the devices 23 and 24, reference may be had to the application of McWhirter et al., Serial No. 79,202, filed March 2, 1949, now Patent No. 2,565,511, issued Aug. 28, 1951 entitled "Register Systems." Leading from the register 24 are twenty section or operator's-position identifying lines 25; a set of seven day-identifying lines 26; and a set of eight week-identifying lines 27. It will be understood, of course, that the invention is not limited to any particular type of translator and register. However one type that has been found satisfactory is that sold under the trade-name "Intelex." The devices 23, 24, are arranged so that the first two digits of the four-digit code control the grounding or electrical marking of a particular one of the twenty lines 25; the third digit controls the marking of a particular one of the eight weekly lines 27; and the fourth digit controls the marking of a particular one of the seven daily lines 26.

When the line-finder 10 seizes the calling line, as above mentioned, the line-finder control relay 28 operates and closes a circuit for the start relay 29 of another line-finder 30. The line-finder 30 comprises two sets of bank contacts 31, 32, and respective rotary brushes 33, 34. The contacts A to N of bank 31 are respectively connected to telegraph message storage units A–N. Each of these units comprises any well-known telegraph impulse storing arrangement, for example in the form of perforated tape, and also includes a receiving section for receiving telegraph impulses to perforate the tape, and a sending portion such as a transmitting distributor for re-transmitting pulses under control of the previously perforated tape. When the start relay 29 is operated as above described, it causes the brush 33 to seek an idle one of the message storage units A to N, and when so seized, the telegraph message pulses repeated by relay 20 are received via brush 33 and the appropriate bank contact to operate the receiving portion of the seized message storage unit.

Figure 4:
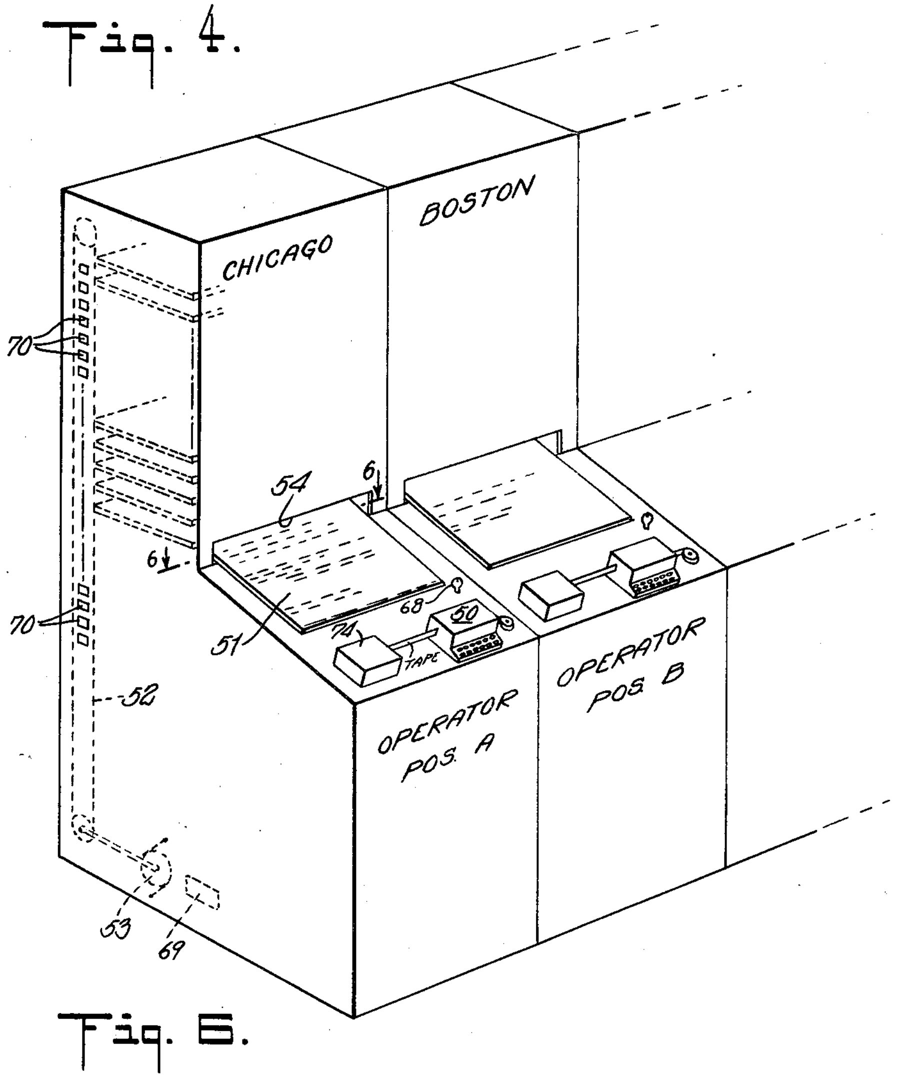
Fig. 4 is a schematic perspective diagram of the operator's automatic file selecting positions.

When the units 23 and 24 have been fully set in accordance with the transmitted telegraph signals, the appropriate conductor in the group 25 is grounded and operates a corresponding relay 35 in the section decoder 36. This decoder may comprise a multi-contact relay 37 having, for example, twenty associated contact sets, and each of these contact sets is connected to a corresponding relay 38 in a selection storage unit 39. By reason of the operation of relays 35 and 37, the particular selection storage unit 39 corresponding to the desired operator's position is therefore selected, and the relay 38 in that unit operates. The selection storage unit 39 comprises a finder switch consisting of three contact banks 40, 41, 42, with respective rotary brushes 43, 44, 45. This switch may be provided with the usual start control mechanism (not shown), so that as soon as relay 38 operates, it closes a circuit for the stepping magnet of the switch, causing it to seek a particular marked terminal in the bank 40. Each of these terminals is connected through the normally open contacts 46 of an associated relay 47. The particular relay 47 that is operated, is determined by the setting of the brush 34 of switch 30. For example, assuming that switch 30 has seized the "A" message storage unit, a circuit will be closed through brush 34, and the "A" contact of bank 32 through the contacts 48A of relay 38 to the winding of relay 47A. With relay 47A operated, marking potential is applied through contacts 46A and thence to the corresponding terminal in bank 40. When this terminal is found, the circuit for the stepping magnet of the finder switch is opened in the well-known way, and the brushes 43, 44, 45, come to rest. The individual bank contacts of bank 42 are connected respectively to the sending portion of the seized message storage unit "A." This unit then transmits the previously recorded telegraph message over line 49, brush 45, and thence to a telegraph printer 50 which is individual to the selection switch unit 39 so that the original telegraph message transmitted from station 4 is reproduced as a printed message and also as a corresponding perforated tape at the device 50. As shown in Fig. 4, each of the operators' positions includes one of the devices 50 and also one of the stacks or series of information files containing the daily information for the particular destination controlled from this particular operator's position. Thus as schematically shown in Fig. 4, there may be a series of fifty-six such files or trays 51 at each operator's position. These trays or files are latchably attached to a suitable conveyor or elevator mechanism 52 driven by a suitable motor 53. Thus by turning motor 53, the various files or trays can be successively brought into alignment with a slot 54 in the front panel of the operator's position. The motor 53 is arranged to be selectively stopped so as to bring the particular desired file corresponding to the reservation date in registry with slot 54, and by any well-known trip mechanism this tray can be ejected through the slot so that the individual information cards carried by the file can be examined by the operator and revisions made thereon after each reservation is transmitted back and confirmed.

The setting of the conveyor 52 and the selection of the proper file, is under the joint control of a calendar-adjuster circuit 55, a grouping circuit 56, and the particular one of a series of file selection storage units 57A–57N. The selection of the particular file selection storage unit is determined by the setting of brush 44 of switch 39. Thus the "A" to "N" contacts of bank 41 are individually connected via conductors 58A–58N to the corresponding control relays 59A–59N of the respective file selection storage units 57A–57N. It will be observed that the start control relay 60A of the selected unit 57A is operated in parallel with the corresponding relay 47A of the seized selection switch unit. The unit 57A comprises two sets of bank contacts 61, 62, with fifty-six in each set, one bank contact for each of the fifty-six trays or files 51, and respective rotary brushes 63, 64. The individual contacts of bank 62 are connected to the grouping circuit 56 which is arranged to ground a particular one of these contacts in accordance with the setting of eight week relays 65 in the grouping circuit and in accordance with the particular one of the seven day conductors 26 that was previously marked by the register 24. When the brush 63 finds this marked set of terminals, ground is extended through the contacts 66 of relay 59A, brush 63, the particular selected one of the fifty-six wires 67, through the normally open contacts 68 of a release key at the operator's position. If the operator is examining a previously-selected file, the key 68 is normal and the grounding of the selected wire 67 does not immediately result in the operation of the driving motor 53. However when the operator has completely confirmed the previous reservation, the key 68 is operated to operate a relay 69 which controls the circuit of motor 53. Relay 69 remains locked by means of limit switches which are held closed mechanically by the ejected tray until re-operation of key 68. Each of the conductors 67 is also connected to a corresponding one of fifty-six magnets 70 which when operated, project a suitable stopping finger to stop further motion of the elevator 52. In other words, the operation of a particular one of the magnets 70 will stop the elevator with the desired selected file tray in registry with the slot 54, and by any suitable mechanism this tray may be ejected through said slot. When the operator again operates the release key 68 at the completion of the reservation confirmation, the file tray is automatically returned through the slot 54 into latching engagement with the elevator 52. It will be observed, therefore, that the switch brushes 63 and 64 remain set in their selected position until the operator has completed the previous reservation confirmation.

When the selected file tray is ejected through slot 54 as above described, there also appears on the telegraph tape of the associated unit 50 the complete printed information concerning the desired reservation. The operator then consults the file to see if the desired space is available. If it is available, the operator then operates the keyboard associated with unit 50, and supplements the printed message as well as the corresponding perforated tape with the additional data identifying the car number and actual reserved space. Since the printed message contains the symbol identifying the calling station, the operator then operates the corresponding key 71 which connects the calling station over its individual telegraph line 72 to the sending unit 73 of a telegraph storage mechanism 74 which in turn is controlled by the revised perforated tape from the unit 50. At the calling station the original message is therefore reproduced in printed form together with the confirmation and actual space allocation data which was added to the tape by the operator under control of unit 50.

As pointed out hereinabove, the physical spacing between the various file trays 51 is fixed, whereas the third or weekly digit of the code number will vary depending upon the particular week of the eight-week period in which the calling reservation is being confirmed. Thus under the above assumption of a calling date of February 15th and a reservation date of February 23rd, if the calling for the reservation is effected on any day during the current week, the third digit of the code would be "2," since the reservation date is in the second week of the current eight-week period. If the calling for the same reservation date of February 23rd is done during the second week, the third digit of the code would be "1." In order therefore automatically to take care of this situation, the calendar-adjuster circuit 55 is provided. Since the system is assumed to operate for a current reservation period of eight weeks ahead, the calendar-adjuster circuit 55 is likewise designed to take care of this situation during the eight-week period. The calendar-adjuster circuit comprises a step-by-step switch having a series of eight brushes movable as a unit across respective banks of contacts. These brushes are provided with an operating magnet 75, which in turn is controlled by a pair of clock-controlled contacts 76. These contacts 76 are arranged to be operated at the beginning of each week under control of a suitable electric clock, so as to advance the brushes of the calendar-adjuster switch one step per week. Each set of bank contacts of the switch 55 comprises eight contacts each of which is connected to a corresponding one of eight relays 65 in the grouping circuit 56. However the contacts in the respective banks are slip-multipled, as shown in the drawing. Thus assuming that the system is at the beginning of the current eight weeks, all the brushes of switch 55 will then be resting on their #1 respective contacts. As above described, a particular one of the weekly conductors 27 is grounded by the register 24 in accordance with the week in which the reservation date occurs. Under the above-assumed condition of a calling date of February 15th and a reservation date of February 23rd, since the calling confirmation is during the current week, only the #2 weekly conductor will be grounded. However all the brushes of switch 55 will be on their #1 bank contacts, thus closing a circuit to operate the second of the eight relays in the grouping circuit 56. If the calling confirmation for this same reservation date were during the second week of the current eight-week period, the third digit of the code would be "1," and only the #1 weekly conductor 27 will be grounded. However at the beginning of the second week, the brushes of switch 55 have been stepped to their #2 bank contacts, thus closing a circuit over the #1 weekly conductor, #1 brush of switch 55 and its #2 bank contact to again operate the #2 relay in the grouping circuit. Thus, even though a different digit is used in the switching code, the same relay in the grouping circuit will be operated for the same reservation date. Consequently the correct contact in the bank 62 of the file selection storage circuit will be marked corresponding to the correct daily file which is to be selected in the space control automatic file.

Figure 7:
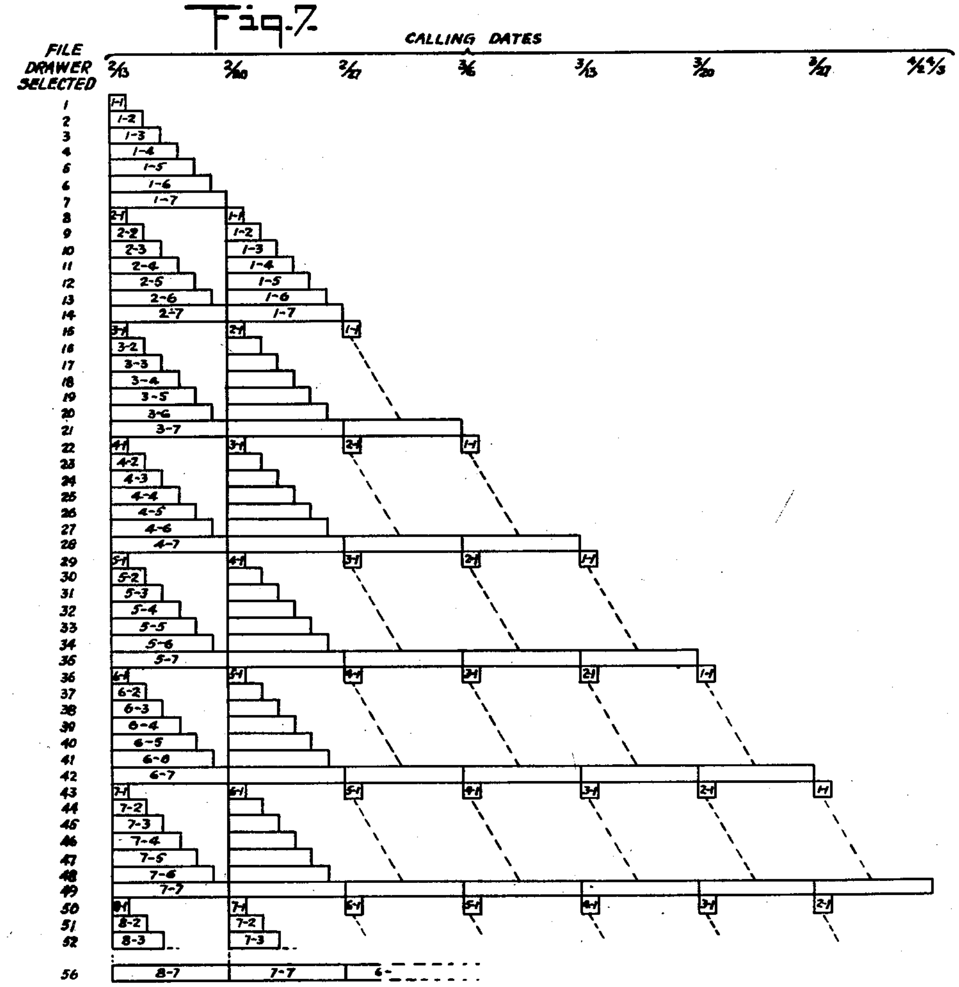
Fig. 7 is a chart showing the relation between the successive file drawers or trays containing the daily information and the third and fourth digits of the switching code necessary to effect selection of the proper file drawer or tray.

The relation between the fifty-six separate file drawers or trays at each operator's position and the third and fourth digits of the switching code, are shown in Fig. 7.

*Summary of sequence of operations*

1. Calling station signals to line-finder 10.

2. Line-finder finds calling line, causes the reperforating distributor circuit 30 to find an available message storage unit, and prepares its line circuit to receive the incoming signals. The line-finder then operates the control relay in the line circuit, to cause the transmitting distributor 6 to start transmitting.

3. The complete message is transmitted simultaneously to the seized message storage unit, to a monitor printer at the calling station and to the electronic receiver and translator 23.

4. The message is received, and the automatic file section (or operator's position) and date information are translated in the device 23 into register markings in the registers 24.

5. The registered (two-digit) automatic file section information is extended to the section decoder 36, wherein it is transformed by means of relays to a single electric marking condition.

6. The marking from the file section decoder 36 indicates which automatic file section at the corresponding operator's position will deal with the message. This marking operates the relay 38 in the seized selection storage circuit which connects the appropriate relay 47A–47N to the re-perforator distributor. This selectively operated relay 47A–47N locks, and records which re-perforator holds the original transmitted message. At the same time, the date marking represented by the third and fourth digits of the code, is steered by that marking from the section decoder 36 into a file selection storage unit 57A–57N, whose selection is determined by the corresponding relay 47A–47N. The selection storage circuit 39 is arranged to provide a record of several messages to even out traffic peaks by which the relays 47A, 47B . . . 47N are operated.

7. When the space controller is free, the operator at the selected automatic file section operates the release key 68, which causes the operating magnet for the brushes of switch 39 to find the previously marked storage circuit determined by the appropriate relay 47A–47N. At the same time, it causes the brushes of the associated file selection storage switch 57A to hunt for and seize the particular marked terminal as determined by the selectively-grounded day conductor 26 and the selectively-operated one of the eight week relays 65 in the grouping circuit 56. When these switches 39 and 57A have found their respective marked contacts, the mechanism of the space control automatic file is positioned with the appropriate file drawer in registry with opening 54 through which it is ejected for the operator's examination. In the meanwhile, the output of the message storage unit is transmitted over the appropriate bank contact and brush 45 of the selection storage circuit to the teleprinter unit 50 at the operator's position.

8. The operator then adds to the record on the message tape from unit 50 the confirmation data for the desired reservation. This complete and revised tape message is then recorded in the receiving section of the storage transmitter unit 74, and when the operator has revised the information on the selected file tray and has restored it through the opening 54 for attachment to the elevator 52, the transmitter section 73 of the storage transmitter 74 is in readiness to re-transmit the original message plus the confirmation portion to the calling station, as a result of the operation of the appropriate key 71.

Figure 6:
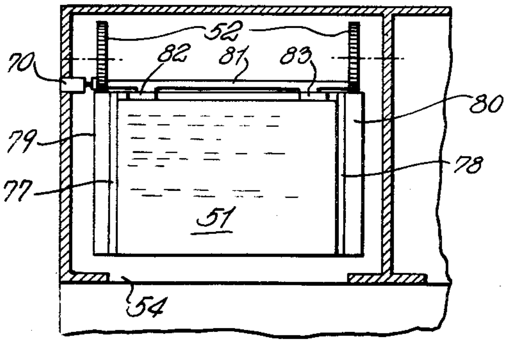
Fig. 6 is a plan-sectional view of the elevator and file-tray mechanism shown in Fig. 4.

It will be understood, of course, that the invention is not limited to any particular tray elevating and ejecting mechanism. However, a typical mechanism that may be employed is that sold under the trade name "Robot Kardex" by Remington Rand Co. Inc. Merely as an illustrative example, Fig. 6 shows one of the trays 51 which is slidable in lateral guides 77, 78, on a pair of arms 79, 80, carried by the elevator 52. The tray 51 may be provided with a suitable latching mechanism (not shown) controlled by a push bar 81, so that when the tray 51 is pushed back or drawn back into the guides 77, 78, it latches in place so that it is clear of the slot 54. The file tray is held in this latched position against the action of springs 82, 83, which tend to eject the tray. The bar 81 is operated by the selected stop member 70 which when operated, may pass through a stop opening in the elevator side wall 52 and thence into engagement with the bar 81, thus releasing the tray 51 so that it can be ejected by the springs 82, 83, through the slot 54 as above described. It will be understood, of course, that the invention is not limited to the manual return of the file tray 51 through the slot 54, and any well-known automatic ejecting and withdrawing mechanism may be employed and controlled by the stop member 70 to effect both the automatic ejection and the automatic withdrawal of the file tray with respect to the elevator 52.

Inasmuch as the operation of line finder switches such as switches 10, 30, 39 and 57 is well-known in the art, detailed description thereof is not deemed necessary herein. However, for a detailed description of the manner of operation of a typical line finder switch, reference may be had to "Automatic Telephony" by A. B. Smith, published by McGraw-Hill Book Company, 1921.

Likewise, while any well-known telegraph message storage units having receiving and sending sections may be employed, a typical unit is Model FRXD obtainable on the market from the Teletype Corporation.

What is claimed is:

1. In a system of the kind described and in combination, telegraph translator and register means responsive to a received telegraph plural digit code, three sets of circuit marking conductors one set corresponding to destinations for which reservation information is desired, a second set corresponding to the week in which a desired reservation is to be confirmed, and a third set corresponding to the days of the week, means to transmit to said translator a four-digit code, the first and second digits of which represent the said destination, the third digit being variable from 1 to "*n*," where "*n*" is the total number of future weeks for which reservation information is currently available and the fourth digit representing the day of the week for which a reservation is to be confirmed, a plurality of groups of reservation information files each group being allotted to a particular destination and each file containing daily reservation information for a corresponding day in said "*n*" weeks, and a calendar adjuster circuit for enabling the same file to be automatically selected for a desired reservation date regardless of the week during which the said telegraph code is being received.

2. A system according to claim 1 in which said calendar adjuster circuit comprises a step-by-step switch having a series of ganged brushes one connected to each marking conductor of said second set, said step-by-step switch having its blank contacts slip-multipled to a series of "*n*" relays, and means for advancing said step-by-step switch one position per week for the purpose set forth.

3. A system according to claim 2, in which said means for advancing said step-by-step switch comprises a clock mechanism and a pair of contacts associated therewith and adapted to be periodically actuated thereby.

4. In a system of the kind described and in combination, a calling reservation station, a plurality of telegraph message storing units, a line finder automatic switch for automatically connecting said station to a free one of said storage units, means to transmit from said station to said connected storage unit a telegraph message including a plural digit switching-control code with at least one digit representing a destination for which reservations are desired, two other digits representing respectively the week and day of the reservation date, a telegraph message translator and register to be variably set by said telegraphed code, a first series of automatic switches, means responsive to the setting of said register to select one of said first series of switches for operation and to control its setting in accordance with the translated destination code digit, a second series of automatic switches each set in accordance with a particular setting of said translator responsive to said other two digits, a plurality of groups of reservation information files, means responsive to the setting of said selected one of the first series of switches for selecting a file group, means responsive to the setting of the selected one of the second series of switches to select a particular file in the selected group, a plurality of individual teleprinters and tape perforators, each of said teleprinters and each of said perforators associated with a different of said file groups for reproducing the said telegraphic messages, each file group also being provided with means to add to the record on said tape, a reservation confirmation portion.

5. A system according to claim 4 in which each file group is connected to a telegraph message storage retransmitter for transmitting the entire message on said tape to a calling station.

6. In a system of the kind described and in combination, a translator register unit which is variably set in accordance with telegraphed digits representing respectively the week and day of a reservation date, a plurality of marking conductors leading from said register one for each of the weeks for which reservation information is currently available, a second set of marking conductors leading from said register one for each day of the week, a series of information files, and means for automatically selecting a particular file for a corresponding reservation date, the last-mentioned means including both said sets of marking conductors and a calendar adjusting circuit which automatically changes the weekly digit representing the reservation week in accordance with the number of weeks from the calling week to the reservation week.

7. In a reservation system of the character described and in combination, a series of information files containing daily space availability information for future dates, said files being arranged in groups, each group allotted to a corresponding destination, a group selection storage unit, an individual file selection storage unit, a series of marking circuits one for each file group, a second series of marking circuits one for each of the weeks during which future reservation information is currently available, a third set of marking circuits one for each day of the week, translating and register means variably set in response to a telegraphed digital code for marking a particular circuit in each of said three sets, a first automatic switch adjustably set to seize the marked circuit in the first set, a second automatic switch adjustably set in accordance with the conjoint marking of the said conductors in the second and third sets, a calendar adjuster circuit connected between said second set of marking circuits and said second automatic switch to enable said second automatic switch to assume the same setting regardless of the particular week during which said digital code is telegraphed, and mechanism responsive to the setting of said second switch for automatically selecting the particular information file bearing the information for a desired future date.

ERIC MALCOLM SWIFT McWHIRTER.
FREDERICK W. WARDEN.

REFERENCES CITED

The following references are of record in the file of this patent:

UNITED STATES PATENTS

| Number | Name | Date |
|---|---|---|
| 1,816,887 | Adams | Aug. 4, 1931 |
| 2,132,684 | Gardner | Oct. 11, 1938 |
| 2,361,246 | Stibitz | Oct. 24, 1944 |